United States Patent Office 3,231,571
Patented Jan. 25, 1966

3,231,571
SYNTHESIS OF 7-AMINOCEPHALOSPORANIC ACID INTERMEDIATES
Stephen Eardley, Greenways, 27 Arlington Drive, Ruislip, James Christopher Phillips Sly, 13 Amanda Court, Langley Road, Slough, Benjamin Arthur Hems, 18 Milton Court, Ickenham, Joseph Elks, 83 The Ridgeway, Golders Green, London, Ronald Major Evans, 19 Derwent Ave., Ickenham, and Alan Gibson Long, 14 Woodland Rise, Greenford, all of England
No Drawing. Filed Apr. 4, 1961, Ser. No. 100,506
Claims priority, application Great Britain, Apr. 6, 1960, 12,265/60
4 Claims. (Cl. 260—243)

The present invention relates to the production of cephalosporin C and derivatives thereof by chemical methods and more particularly to the production of intermediates thereof.

Cephalosporin C possesses antibiotic activity in some respects similar to that of the penicillins. However, it appears not to be attacked by penicillinase, an enzyme which breaks down penicillins, and cephalosporin C and derivatives thereof are thus of value in the treatment of various conditions caused by penicillinase-producing organisms, particularly infections produced by penicillin-resistant staphylococci.

The chemical structure of cephalosporin C is generally accepted to be as follows:

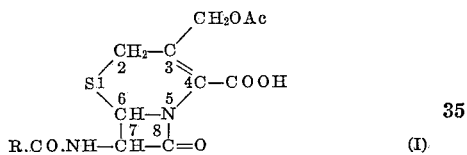
(I)

(where R is the residue

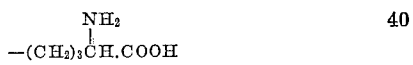

and Ac is an acetyl residue). As in the case of the penicillins variation of the nature of the residue R gives rise to derivatives of cephalosporin C having varying antibiotic activities and some of such derivatives are important. It is thus useful to obtain 7-aminocephalosporanic acid (that is cephalosporin C having a free —$NH_2$ group instead of the —NH.CO.R group) and acyl derivatives thereof other than cephalosporin C itself.

The production of cephalosporin C by fermentation is attended by various difficulties and there is thus considerable interest in achieving a chemical synthesis of this substance itself.

It is thus an object of the invention to provide new procedures and intermediates useful in the synthesis of 7-aminocephalosporanic acid and cephalosporin C, and analogues thereof.

We have found that intermediates of value in the chemical synthesis of 7-aminocephalosporanic acid, cephalosporin C and derivatives thereof may be obtained by condensing certain α-amino-γ-mercapto-butyric or crotonic acids and derivatives thereof with acylated amino-malonaldehydic acid esters.

According to the invention, therefore, we provide a process for the preparation of intermediates useful in the synthesis of 7-aminocephalosporanic acid and cephalosporin C, and analogues thereof, which comprises condensing a compound (or salt thereof) of the general formula $$HS-CH_2-Z-NH_2 \qquad (II)$$

(in which Z is the group:

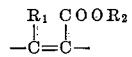

or

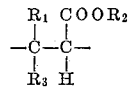

the groups $R_1$, $R_2$ and $R_3$ being defined as follows:

$R_1$ is a hydrogen atom, an alkyl, substituted alkyl (particularly a —$CH_2OH$ or —$CH_2OAc$ group, Ac being an acyl group) or alkenyl group;

$R_2$ is a hydrogen atom, an alkyl or aralkyl group or together with $R_1$ forms a methylene group; and $R_3$ is a hydrogen or halogen atom, a hydroxyl, alkoxy or acyloxy group or together with $R_1$ forms an alkylidene group or an epoxy derivative thereof);

with an acylated amino-malonaldehydic acid ester of the general formula:

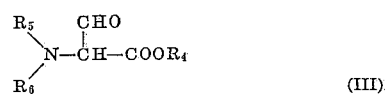
(III)

(in which $R_4$ is an aliphatic or an aralkyl group;

$R_5$ is a hydrogen atom; and $R_6$ is an acyl group or a triphenylmethyl group or $R_5$ and $R_6$ together form a divalent acyl group derived from a dicarboxylic acid);

to form a substituted thiazane of the general formula:

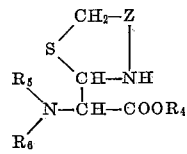

(in which Z, $R_4$, $R_5$ and $R_6$ have the meanings defined above).

The acylated amino-malonaldehydric acid ester is preferably an alkyl ester, in particular a tert-butyl ester. The amino-group of this amino-malonaldehydic acid may be acylated by a convenient monocarboxylic acyl radical (e.g. the radical R.CO of a desired cephalosporin C derivative, phenoxyacetyl, α-phenoxypropionyl, phenylacetyl, 2,6-dimethoxybenzoyl, etc.), or by a dicarboxylic acid, such as phthalic acid (whereby a phthalimido group is formed).

Thus the compound of general Formula II may be an α-amino-γ-mercapto-crotonic acid or ester of the general formula:

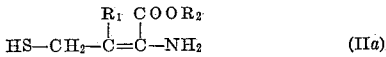
(IIa)

(in which $R_1$ is a hydrogen atom, an alkyl or alkenyl group, or a substituted alkyl group, in particular a $CH_2OH$ or—$CH_2OAc$ group, and $R_2$ is a hydrogen atom or an alkyl or aralkyl group). Where a compound of Formula IIa is reacted with an acylated amino-malonaldehydic ester of formula

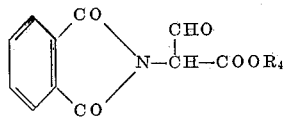
(IIIa)

where $R_4$ has the meaning defined above), the desired product will be dihydrothiazine derivative of formula

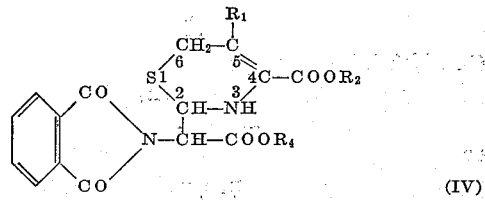

(IV)

Alternatively, however, it may be desired to use an α-amino-γ-mercapto-butyric acid or ester, which may be substituted by a group suitable for the introduction of a double bond in the 3,4-position of the cephalosporin nucleus (it being noted that the numbering of the simple thiazizine ring is not the same as that of the corresponding ring in the cephalosporin nucleus) at a later stage of the synthesis (if unsaturation be required). Such a compound may be of the formula:

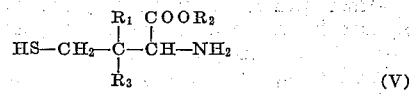

(V)

in which $R_1$ and $R_2$ have the meanings defined above for compound of Formula IIa and $R_3$ is a hydrogen or a halogen atom, a hydroxyl, an alkoxy, acyloxy group. In addition $R_1$ and $R_3$ may together constitute an alkylidene group or an epoxy derivative thereof. Of the groupings suitable for the introduction of a double bond in the 3,4-position of the cephalosporin nucleus we prefer that $R_3$ should be a hydroxyl, acyloxy or alkoxy group.

It may also be convenient to use a lactone derived from an α-amino-γ-mercapto-butyric or crotonic acid substituted in the β-position with a —CH$_2$OH group. Such compounds have the structures

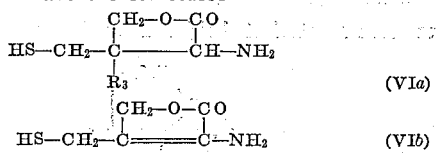

(VIa)

(VIb)

The condensation of compounds of general Formula II with acylated amino-malonaldehydic acid esters may be carried out under various conditions and may result in one or more isomers being obtained. Whilst the reaction may be carried out under slightly alkaline conditions, acid conditions are generally desirable. Thus pH's less than 9 and preferably less than 7 may be used. The reaction is preferably carried out under mild conditions to prevent destruction of the reaction components or product.

The condensation is preferably carried out in the presence of a solvent, advantageously in a homogeneous solvent medium. For this we prefer a mixture of water and a water-miscible solvent, e.g. an alcohol, preferably ethanol/water or methanol/water mixtures, since the presence of water aids the separation of the reaction product from the reaction mixture.

The compound of general Formula II may, if desired, be used in the form of a salt. If this is the case it may be necessary to control the pH with the aid of a suitable buffer. Any convenient buffer may be used for the purpose, such as, for example, sodium acetate. However, the condensation may also be carried out in the absence of a buffer under "natural" pH conditions.

Compounds of general Formula II may be obtained by any convenient method, for example, the following synthetic routes may be employed where appropriate.

(1) Compounds of general Formula IIa may be conveniently prepared from derivatives of crotonic acid having the general formula

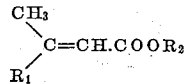

(VII)

(where $R_1$ and $R_2$ have the above-stated meanings, by introduction (a) of a mercapto group on the free β-methyl group and (b) of an amino group on the α-carbon atom. Introduction of the mercapto group is conveniently effected by brominating the free β-methyl group with N-bromosuccinimide, followed by substitution of the bromine atom by a mercapto group or a substituted mercapto group (for protection), e.g. by reaction with benzyl mercaptan. The substituted mercapto derivative of VII may then be nitrated to introduce an α-NO$_2$ group, which may then be selectively reduced to the corresponding amino compound, e.g. with a metallic reducing agent such as aluminium amalgam conveniently in moist ether. Finally, any protective group on the mercapto group should be removed, for example by treatment wtih an alkali or alkaline earth metal e.g. lithium, sodium or calcium, in liquid ammonia. It will be appreciated that nitration to give the α-nitro derivative of VII and even reduction to the corresponding α-amino derivative can precede the introduction of the mercapto group, and if desired the α-amino group may be protected, for example with an acyl group.

(2) The compounds obtained by introducing a mercapto group (or substituted mercapto group) into compounds of Formula VII may be given the general formula

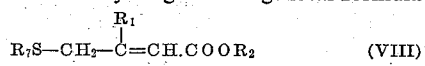

(VIII)

(in which $R_7$ is a hydrogen atom, or a benzyl, benzoyl or acetyl group or other suitable protecting group).

Compounds of this general formula afford a convenient route to compounds of general Formula V in which $R_3$ is a hydroxyl or alkoxy group. Thus for example VIII may be treated with Br$_2$ and an alkanol to yield the compound

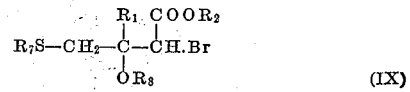

(IX)

(where $R_8$ is an alkyl group). Similarly, upon treatment of VIII with HOBr the corresponding hydroxyl compound ($R_8$=hydrogen) may be obtained, or alternatively it may be produced via the epoxide of VIII.

The desired α-amino group may be substituted for the α-bromine atom by ammonolysis, and the group $R_7$ (except where $R_7$ is hydrogen) removed to yield a compound of Formula V in which $R_3$ is a hydroxyl or alkoxy group.

It will be appreciated that the thiazane derivatives obtainable by the above-described condensation represent key intermediates in the synthesis of cephalosporin C and derivatives thereof. Thus the condensation product contains the desired thiazane ring, suitably substituted, an esterified carboxyl group which, upon hydrolysis, is in a position to form the β-lactam ring, and a protected amino group which may either be acylated already with the desired R.CO residue mentioned above, or may be hydrolysed to yield a free amino group and, if desired, be re-acylated, or may alternatively be protected with the trityl group, which may be hydrolysed off if desired, after formation of the β-lactam ring.

The chemical features of the condensation product described above, and the further basic reactions involved in forming cephalosporin C and derivatives thereof will be illustrated in the case of the simplest α-amino-γ-mercaptobutyric acid, namely homocysteine, condensed with the compound of Formula III in which $R_4$ is a tert-butyl group and $R_5$ and $R_6$ together represent a phthaloyl group. Thus the condensation product has the formula:

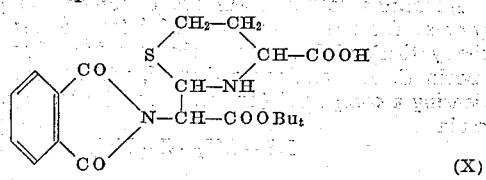

(X)

Since it is generally the case that β-lactams are somewhat unstable it is desirable that the formation of the β-lactam ring should form one of the last stages of a given synthesis. We prefer first to esterify the free carboxyl group followed by replacement of the acyl group by the desired acyl group, if necessary. Thus the insolubility of the free carboxylic acids may be such that one cannot remove the phthaloyl group except under conditions vigorous enough to cleave the thiazane ring. Naturally, if the active compound desired is a free acid a subsequent hydrolysis step will be required. The phthalimido grouping may particularly conveniently be split up by treating the compound of Formula X or an ester thereof with hydrazine, preferably in the presence of an inert solvent such as, for example, dioxane. In this reaction a phthalhydrazide complex is first formed, and this may then be decomposed by treatment with an acid under mild conditions (e.g. at temperatures of 10–20° C.).

Splitting of the phthalimido group with hydrazine is preferred since treatment wtih this reagent may generally be effected under milder conditions than hydrolysis with an acid.

When the phthalhydrazide complex is decomposed, for example, with hydrochloric acid, the resulting compound has a free amino group which can then, if desired, be further substituted by another acyl group, for example by treatment with a suitable acid halide;

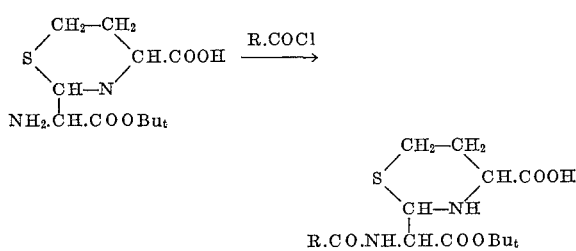

This acylation is preferably carried out under conditions which will not result in undesired acylation or degradation elsewhere in the molecule. It is convenient, therefore, to carry out the reaction at a low temperature (e.g. 0° C.) in the presence of an acid-binding agent for the liberated hydrohalic acid; a suitable inert solvent may also be present.

Having, if desired, altered the nature of the acyl group on the 7-amino group, the ester group on the side chain may be hydrolysed to form a free —COOH group prior to β-lactam formation. This hydrolysis may be effected under conditions convenient for hydrolysis of esters, bearing in mind, however, that other labile groups should preferably not be affected. In this connection, it is particularly convenient that there should have been used the tert-butyl ester of amino-malonaldehydic acid, since this group is labile to anhydrous acids at low temperatures. Thus the tert-butyl group of the above thiazane derivative may for example be removed by treating the compound, in solution in an inert solvent (e.g. methylene chloride) at 0° C. with anhydrous gaseous HCl. The resulting compound is a salt formed by the particular acid used and the —NH— group of the thiazane ring. This is converted to a basic group once more by treatment with a base, for example with pyridine.

It will be appreciated that although we prefer to employ the above sequence, the ester grouping may be hydrolysed first, followed by any desired reaction at the 7-position. In either case, however, we prefer in general that β-lactam formation should follow any reaction at the 7-position although where the 7-position is protected by a trityl group this is so readily removed that β-lactam formation can take place first. This step is represented in our illustrative example by the reaction:

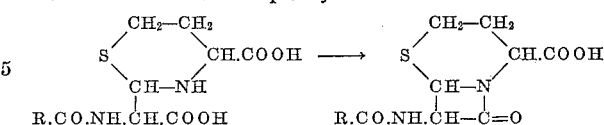

A convenient way of effecting the desired ring-closure to form the β-lactam which employs mild conditions is in the presence of an aliphatic or alicyclic carbodiimide in an aqueous or an organic medium. This reaction may be carried out at room temperature conveniently in the presence of an alkali metal hydroxide or using an ester of the acid. Examples of carbodiimides which may be used include N,N'-dicyclohexylcarbodiimide and N,N'-diisopropylcarbodiimide. Other reagents having a similar ring-closing action include ethoxy-acetylene and N,N'-carbonyldiimidazole.

In addition to the means already described, unsaturation in the thiazane ring of the desired compounds may be produced by microbiological dehydrogenation or chemical means (e.g. treatment with selenium dioxide or mercuric acetate) preferably at a late stage of the synthesis, in particular after the thiazane ring has been formed, and even as the final stage of the synthesis.

In summary, in the production of cephalosporin C and derivatives thereof, the principal reactions involved after the production of a compound containing a thiazane ring as described above may be grouped as follows:

(1) Reactions affecting the 7-amino group of cephalosporin C.

(2) Reactions affecting substituents in the thiazane ring, e.g. elimination of substituents to introduce unsaturation, dehydrogenation etc.

(3) Hydrolysis of the appropriate ester group and formation of the β-lactam ring.

However, as is to be seen in the foregoing description, these reactions may be carried out in any convenient order.

The following examples are provided by way of illustration only.

EXAMPLE 1

*t-Butyl α-phthalimido-(4-carboxy-thiazane-2)-acetate*

To a warm ethanolic solution (5 ml.) of t-butyl α-phthalimidomalonaldehydate (0.70 g.; 0.0024 mole) prepared under prepurified nitrogen was added DL-homocysteine (0.27 g.; 0.002 mole) in oxygen-free water (5 ml.). The yellow solution, under nitrogen, was maintained at 35° C. for 90 hr. when the solid which had separated was collected and dried (0.162 g.), M.P. 172–176° C. (Kofler);

λ max., 282 mμ ($E^{1\%}_{1 cm.}$ 129); $E^{1\%}_{1 cm.}$ 515 (4% NaOH) EtOH

Calcd. for $C_{19}H_{22}O_6S$: C, 56.15; H, 5.46; N, 6.89; S, 7.87%. Found: C, 56.14; H, 5.54; N, 6.47; S, 7.65%. The compound obtained was an impure specimen of isomer B obtained in Example 3.

EXAMPLE 2

*t-Butyl α-phthalimido-(4-carboxy-thiazane-2)-acetate (isomer A)*

To an ethanolic solution (40 ml.) of t-butyl α-phthalimidomalonaldehydate (5 g., 0.0173 mole) was added a solution of DL-homocysteine (2.34 g., 0.0173 mole) in water (22 ml.) and N-hydrochloric acid (18 ml.). The resulting solution (pH 1.6) under nitrogen, was allowed to stand at room temperature for 1 week when the thiazane (1.39 g.), which first separated after 96 hr., was collected and dried; M.P. 168–172° (Kofler);

λ max. 286–291 mμ ($E^{1\%}_{1 cm.}$ 60); λ max. 282 mμ ($E^{1\%}_{1 cm.}$ 543) in 4% NaOH/EtOH, λ max. 275 mμ ($E^{1\%}_{1 cm.}$ 585) in HgCl₂ (1 equiv.)/EtOH (Found: C, 56.0; H, 5.45; N, 7.0; S, 7.6. $C_{19}H_{22}N_2O_6S$ requires C, 56.15; H, 5.5; N, 6.9; S, 7.9%.)

EXAMPLE 3

*t-Butyl α-phthalimido-(4-carboxy-thiazane-2)-acetate (isomer B)*

To an ethanolic solution (45 ml.) of t-butyl α-phthalimidomalonaldehydate (10 g., 0.0346 mole) was added a solution of DL-homocysteine (3.86 g., 0.0286 mole) in water (45 ml.). The solution under nitrogen, was set aside at 35° for 2½ days when the solid that had separated, was collected, washed with 50/50 v./v. ethanol-water (10 ml.) and dried, 4.01 g., M.P. 164–167°, λ max. 281 mμ ($E_{1cm}^{1\%}$ 177); λ max. 283 mμ ($E_{1cm}^{1\%}$ 535) in 4% NaOH/EtOH Part of this solid (3.5 g.) was finely ground and triturated with acetone (40 ml.) for 1 hr. at room temperature. The mixture was then set aside in the refrigerator for 2 hr. and the insoluble thiazane isomer B (2.47 g.) was collected and dried, M.P. 163–169°, λ max. 282–286 mμ ($E_{1cm}^{1\%}$ 82); λ max. 283 mμ ($E_{1cm}^{1\%}$ 546) in 4% NaOH, λ max. 275–276 mμ ($E_{1cm}^{1\%}$ 612) in $HgCl_2$ (1 equiv.)/EtOH (Found: C, 56.15; H, 5.5; N, 6.8; S, 7.45. $C_{19}H_{22}N_2O_6S$ requires C, 56.15; H, 5.5; N, 6.9; S, 7.9%). Part of this isomer (400 mg.) was recrystallised from acetone to convert it into thiazane isomer D (340 mg., 85%), M.P. 171–174°.

EXAMPLE 4

*t-Butyl α-phthalimido-(4-carboxy-thiazane-2)-acetate (isomer D)*

To a warm ethanolic solution (30 ml.) of t-butyl α-phthalimidomalonaldehydate (10 g., 0.0346 mole) was added a solution of DL-homocysteine (3.86 g., 0.0286 mole) in water (30 ml.). An oil, which separated as the solution cooled, was quickly dissolved by addition of 50/50 v./v. ethanol-water (25 ml.). The solution under nitrogen, was then set aside at 35° for 2½ days when the solid that had separated was collected, washed, and dried; 8.89 g., M.P. 167°, λ max. 280 mμ ($E_{1cm}^{1\%}$ 310), λ max. 281–283 mμ ($E_{1cm}^{1\%}$ 564) in 4% NaOH/EtOH Part of this solid (3.5 g.) was dissolved in acetone (400 ml.). The bulk of solvent was then reduced to 80 ml. and the solution was set aside overnight in the refrigerator, during which time the thiazane isomer D crystallised in clusters of small needles (1.17 g.), M.P. 171–175°;

λ max. 290–293 mμ ($E_{1cm}^{1\%}$ 59); λ max. 281–283 mμ ($E_{1cm}^{1\%}$ 542) in 4% NaOH/EtOH; λ max. 275–276 mμ ($E_{1cm}^{1\%}$ 550) in $HgCl_2$ (1 equiv.)/EtOH (Found: C, 56.0; H, 5.6; N, 6.7; S, 7.8. $C_{19}H_{22}N_2O_6S$ requires C, 56.15; H, 5.5; N, 6.9; S, 7.9%.)

EXAMPLE 5

*t-Butyl α-phthalimido-(4-carboxy-thiazane-2)-acetate (isomer F)*

To a cooled (0–5°) ethanolic solution of t-butyl α-phthalimidomalonaldehydate (25 g., 0.0865 mole) was added a solution of DL-homocysteine (11.7 g., 0.0865 mole) in air-free water (300 ml.), that had also been cooled (0–5°). The solution was set aside in the refrigerator for 2 days when the fine solid (0.279 g.) that had separated was removed; this was mainly DL-homocysteine. The filtrate was then returned to the refrigerator and allowed to stand for a month before the thiazane which first separated after 4 days, were collected and dried, 15.47 g., M.P. 151–160°;

λ max. 281–288 mμ ($E_{1cm}^{1\%}$ 62), λ max. 281–282 mμ ($E_{1cm}^{1\%}$ 488) in 4% NaOH/EtOH This mixture was shaken in acetone (1250 ml.) at room temperature for 1 hr. and the insoluble thiazane isomer B was separated; 2.0 g., M.P. 161–163°. The bulk of solvent was then reduced in vacuo to 370 ml.; the solution, after standing overnight in the refrigerator, deposited the thiazane isomer F as birefringent rods (8.33 g.), M.P. 158–161°;

λ max. 289–291 mμ ($E_{1cm}^{1\%}$ 46); λ max. 281 mμ ($E_{1cm}^{1\%}$ 507) in 4% NaOH/EtOH; λ max. 274 mμ ($E_{1cm}^{1\%}$ 483) in $HgCl_2$ (1 equiv.)/EtOH (Found: C, 55.8; H, 5.5; N, 6.7; S, 7.8. $C_{19}H_{22}N_2O_6S$ requires C, 56.15; H, 5.5; N, 6.9; S, 7.9%.)

EXAMPLE 6

*t-Butyl α-phthalimido-(4-carboxy-thiazane-2)-acetate (isomer B and isomer D)*

To an ethanolic solution (300 ml.) of t-butyl α-phthalimidomalonaldehydate (25 g., 0.0865 mole) cooled to 0° was added a solution of DL-homocysteine (11.7 g., 0.0865 mole) in water (300 ml.). The solution was left in a water bath at 17–20° for 10 days when the thiazane isomer B, which first separated after 15 hr., was collected, washed with 50/50 aqueous ethanol (2 x 50 ml.), and dried; 9.8 g. (28%), M.P. 162–165°.

Crystallisation of this isomer (9.7 g.) from acetone gave thiazane isomer D (7.3 g., 75%), M.P. 173–178°.

EXAMPLE 7

*t-Butyl α-phthalimido-(4-carboxy-thiazane-2)-acetate (isomer B)*

To an ethanolic solution (10 ml.) of t-butyl α-phthalimidomalonaldehydate (1.445 g., 0.005 mole) was added a solution of DL-homocysteine (0.675 g., 0.005 mole) and sodium acetate trihydrate (1.02 g., 0.075 mole) in 2.11 N hydrochloric acid (2.37 ml., 0.005 mole) and water (7.63 ml.). The solution was set aside at room temperature (20–24°) for 1 week during which time thiazane isomer B slowly separated (0.13 g., 6.4%), M.P. 166–172°, λ max. 282–286 mμ ($E_{1cm}^{1\%}$ 87), λ max. 280–282 mμ $E_{1cm}^{1\%}$ 506) in 4% NaOH/EtOH

EXAMPLE 8

*t-Butyl α-phthalimido-(4-carbomethoxy-thiazane-2)-acetate (isomer A)*

A stirred suspension of the thiazane-4-carboxylic acid, isomer A (1 g., 0.00246 mole) in ether-dioxan (50/50 v./v.) was treated with an excess of ethereal diazomethane. Complete solution occurred after 4 hr.; the solvents were removed in vacuo to leave a solid (1.13 g.). Crystallisation from ethanol gave the methyl ester (0.896 g.), M.P. 137–142°, as birefringent prisms, λ max. 290–293 mμ ($E_{1cm}^{1\%}$ 43); λ max. 280–283 mμ ($E_{1cm}^{1\%}$ 552) in 4% NaOH/EtOH (Found: C, 57.4; H, 5.8; N, 6.4; S, 7.5. $C_{20}H_{24}N_2O_6S$ requires C, 57.1; H, 5.75; N, 6.7; S, 7.6%.) A sample, recrystallised from alcohol and then from acetone had M.P. 141° (Found: C, 56.7; H, 5.9%), and showed no differences in its infra-red spectrum.

EXAMPLE 9

*t-Butyl α-phthalimido-(4-carbomethoxy-thiazane-2)-acetate (isomer D)*

The thiazane-4-carboxylic acid, isomer D (1 g., 0.00246 mole) was suspended in dioxan (20 ml.) and stirred for 3½ hr. with an excess of ethereal diazomethane when all the acid dissolved. The excess of diazomethane was destroyed with acetic acid and the solution was washed with saturated sodium hydrogen carbonate solution and water and dried. Removal of the solvents in vacuuo left a white solid which was crystallised from ethanol to give the methyl ester isomer D as prisms (0.7 g.), M.P. 145–149°;

λ max. 290–293 mμ ($E_{1cm}^{1\%}$ 62); λ max. 281–282 mμ ($E_{1cm}^{1\%}$ 557) in 4% NaOH/EtOH; λ max. 273–275 mμ ($E_{1cm}^{1\%}$ 604) in HgCl₂ (1 equiv.)/EtOH (Found: C, 57.4; H, 5.9; N, 6.65; S, 7.5. $C_{20}H_{24}N_2O_6S$ requires C, 57.1; H, 5.75; N, 6.7; S, 7.6%.)

EXAMPLE 10

*t-Butyl α-phthalimido-(4-carbomethoxy-thiazane-2)-acetate (isomer F)*

The thiazane-4-carboxylic acid, isomer F (12.06 g., 0.0297 mole) was suspended in ether (120 ml.) and the suspension was stirred with an excess of diazomethane for 4½ hr. The suspension was then filtered to remove low-melting impurities and the excess diazomethane was destroyed with acetic acid. The solution was washed with sodium hydrogen carbonate solution (50 ml.), water (50 ml.) and dried over magnesium sulphate. On reducing the volume of ether to 40 ml., the methyl ester isomer F crystallised in clusters of birefringent prisms (7.85 g.), M.P. 153–159°. Recrystallisation of the ester (7.78 g.) from ethanol gave large prisms (7.5 g.), M.P. 155–158°;

λ max. 289–293 mμ ($E_{1cm}^{1\%}$ 48), λ max. 279.5 mμ ($E_{1cm}^{1\%}$ 685) in 4% NaOH/EtOH; λ max. 271 mμ ($E_{1cm}^{1\%}$ 642) in HgCl₂ (1 equiv.)/EtOH (Found: C, 57.1; H, 5.9; N, 6.3; S, 7.6. $C_{20}H_{24}N_2O_6S$ requires C, 57.1; H, 5.75; N, 6.7; S, 7.6%.)

EXAMPLE 11

*t-Butyl α-phthalimido-(4-carbomethoxy-thiazane-2)-acetate (isomer D)*

The thiazane-4-carboxylic acid isomer B (200 mg.) was suspended in dioxan (20 ml.) and ether (15 ml.) and stirred with an excess of ethereal diazomethane (5 ml.). The acid dissolved after 10 min. and after 15 min. the excess of diazomethane was destroyed by addition of acetic acid. The solution was washed with sodium hydrogen carbonate solution, water and dried. The solvents were removed in vacuo and the methyl ester isomer D was crystallised from ethanol; 174 mg. (84%), M.P. 143–147°;

λ max. 289–293 mμ ($E_{1cm}^{1\%}$ 59); λ max. 282 mμ ($E_{1cm}^{1\%}$ 548) in 4% NaOH/EtOH

EXAMPLE 12

*t-Butyl α-phthalimido-(4-carboxy-5-methylthiazane-2)-acetate*

β-methylhomocysteine was prepared as follows: methacrolein was treated with benzylmercaptan in the presence of piperidine to give α-methyl-β-benzyl thiopropionaldehyde; B.P. 164°/15 mm., $n^{22.5°}$ 1.5505. Reaction of this compound with sodium cyanide and ammonium carbonate in aqueous ethanol gave the corresponding hydantoin; M.P. 149–150°, which was hydrolysed by boiling 20% sodium hydride to S-benzyl-β-methylhomocysteine, M.P. 233–235°. Finally, this compound was debenzylated with sodium in liquid ammonia to give β-methylhomocysteine, M.P. 240° (decomp.).

To an ethanolic solution (19.3 ml.) of t-butyl α-phthalimidomalonaldehydate (1.156 g., 0.004 mole) was added a solution of β-methylhomocysteine (0.596 g., 0.004 mole) in water (19.3 ml.) and the solution was kept in the refrigerator. A solid began to separate after one week; after one month, this was collected, washed with 50/50 v./v. ethanol-water (10 ml.), and dried (0.329 g.); M.P. 153–155°;

λ max. 284–287 mμ ($E_{1cm}^{1\%}$ 74); λ max. 283 mμ ($E_{1cm}^{1\%}$ 522) in 4% NaOH/EtOH From the filtrate, which was allowed to remain in the refrigerator for a further 2 weeks, more of the compound was obtained; 0.128 g., M.P. 151–153°. The two compounds were combined and part (340 mg.) was recrystallized from acetone to give t-butyl α-phthalimido-(4-carboxy-5-methylthiazane-2)acetate (38 mg.), M.P. 160–163°. (Found: C, 57.0; H, 5.8; N, 6.45. $C_{20}H_{24}N_2O_6S$ requires C, 57.1; H, 5.75; N, 6.7%.) A second crop (159 mg.) had M.P. 163–167°.

We claim:

1. t-Butyl α-phthalimido-(4-carboxy-thiazane-2-)-acetate.

2. t-Butyl α-phthalimido-(4-carbomethoxy-thiazane-2)-acetate.

3. t-Butyl α-phthalimido-(4-carboxy-5-methylthiazane-2)-acetate.

4. Compounds of the formula

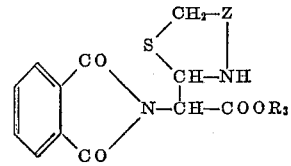

in which Z is selected from the group consisting of

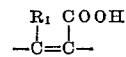

and

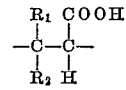

where $R_1$ is selected from the group consisting of hydrogen, lower alkyl and —$CH_2OH$, $R_2$ is selected from the group consisting of hydrogen, hydroxyl and halogen and $R_3$ is a lower alkyl group.

References Cited by the Examiner

UNITED STATES PATENTS 3,159,617    12/1964    Sheehan _____ 260—239.1

NICHOLAS S. RIZZO, *Primary Examiner.*

JAMES W. ADAMS, *Assistant Examiner.*